July 26, 1960 W. F. BOEING 2,946,202
AUTOMATIC ICE CUBE MAKING MACHINES
Filed Jan. 17, 1958 7 Sheets-Sheet 1

Inventor
Walton F. Boeing
By Smith, Prangley, Baird & Clayton,
Attys.

July 26, 1960 W. F. BOEING 2,946,202
AUTOMATIC ICE CUBE MAKING MACHINES
Filed Jan. 17, 1958 7 Sheets-Sheet 2

Inventor
Walton F. Boeing
By Smith, Prangley, Baird & Clayton,
Attys.

July 26, 1960 W. F. BOEING 2,946,202
AUTOMATIC ICE CUBE MAKING MACHINES
Filed Jan. 17, 1958 7 Sheets-Sheet 4
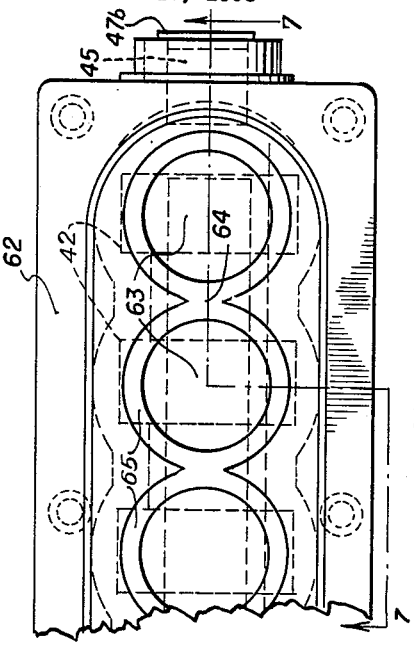
FIG. 6
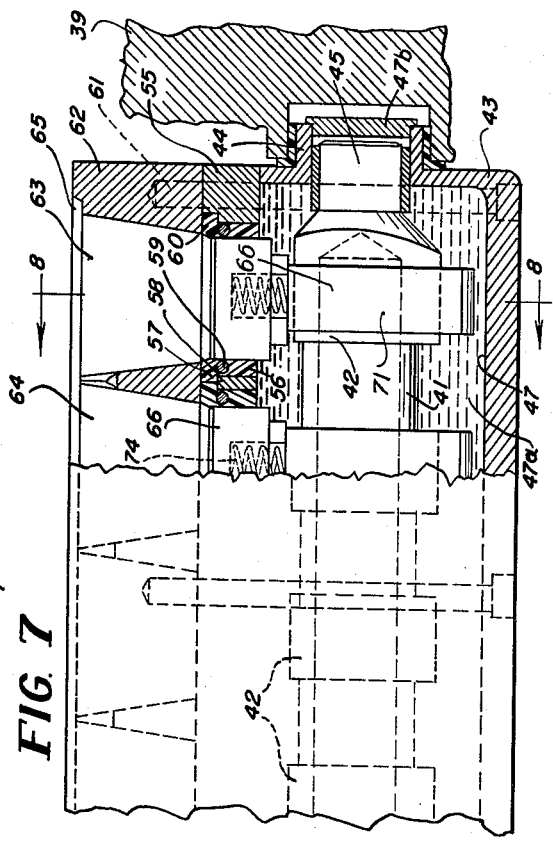
FIG. 7
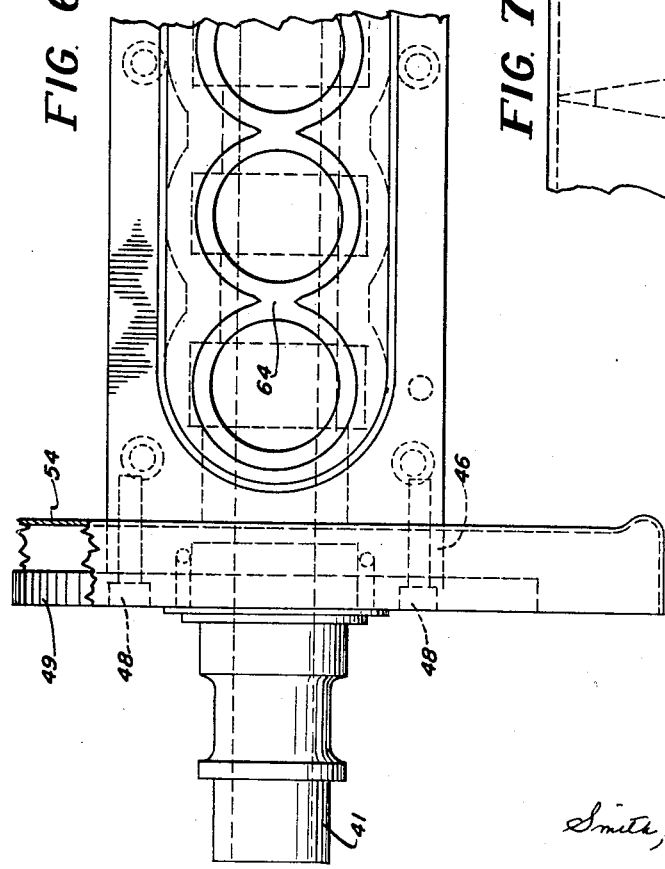
Inventor
Walton F. Boeing
By Smith, Prangley, Baird & Clayton
Attys.

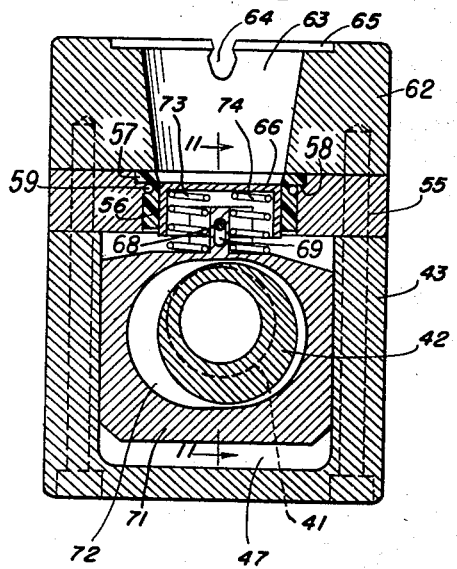
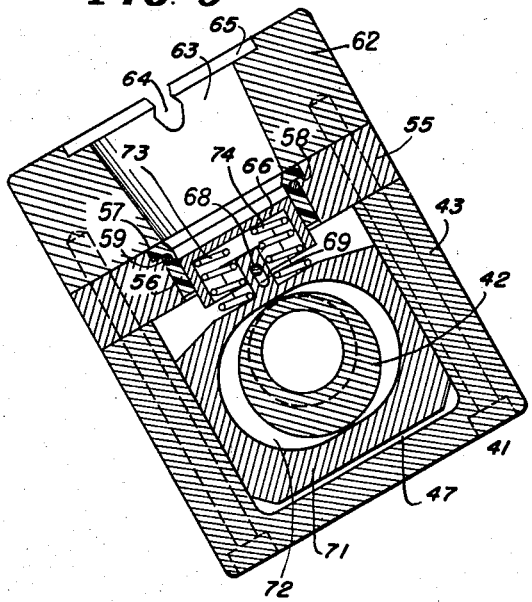
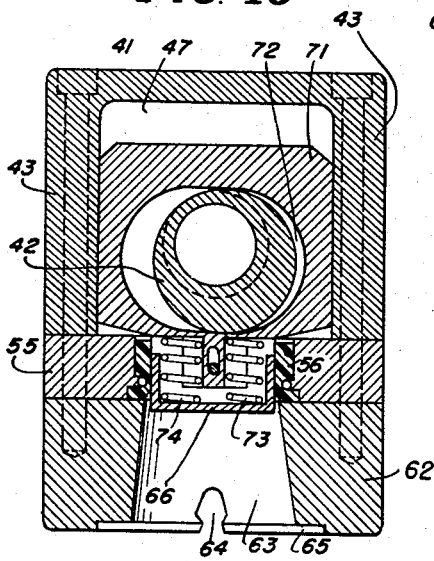
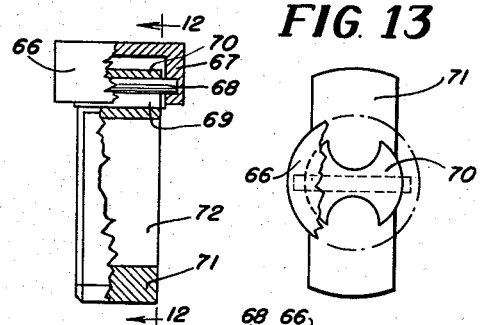
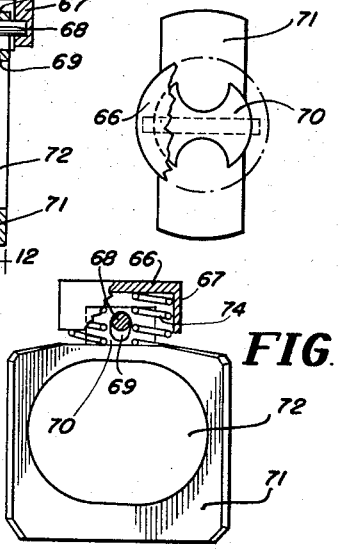
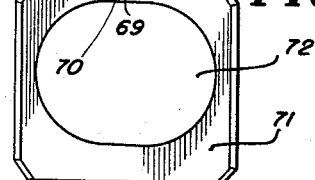

July 26, 1960  W. F. BOEING  2,946,202
AUTOMATIC ICE CUBE MAKING MACHINES
Filed Jan. 17, 1958  7 Sheets-Sheet 6

Inventor
Walton F. Boeing
By Smith, Prangley, Baird & Clayton
Attys.

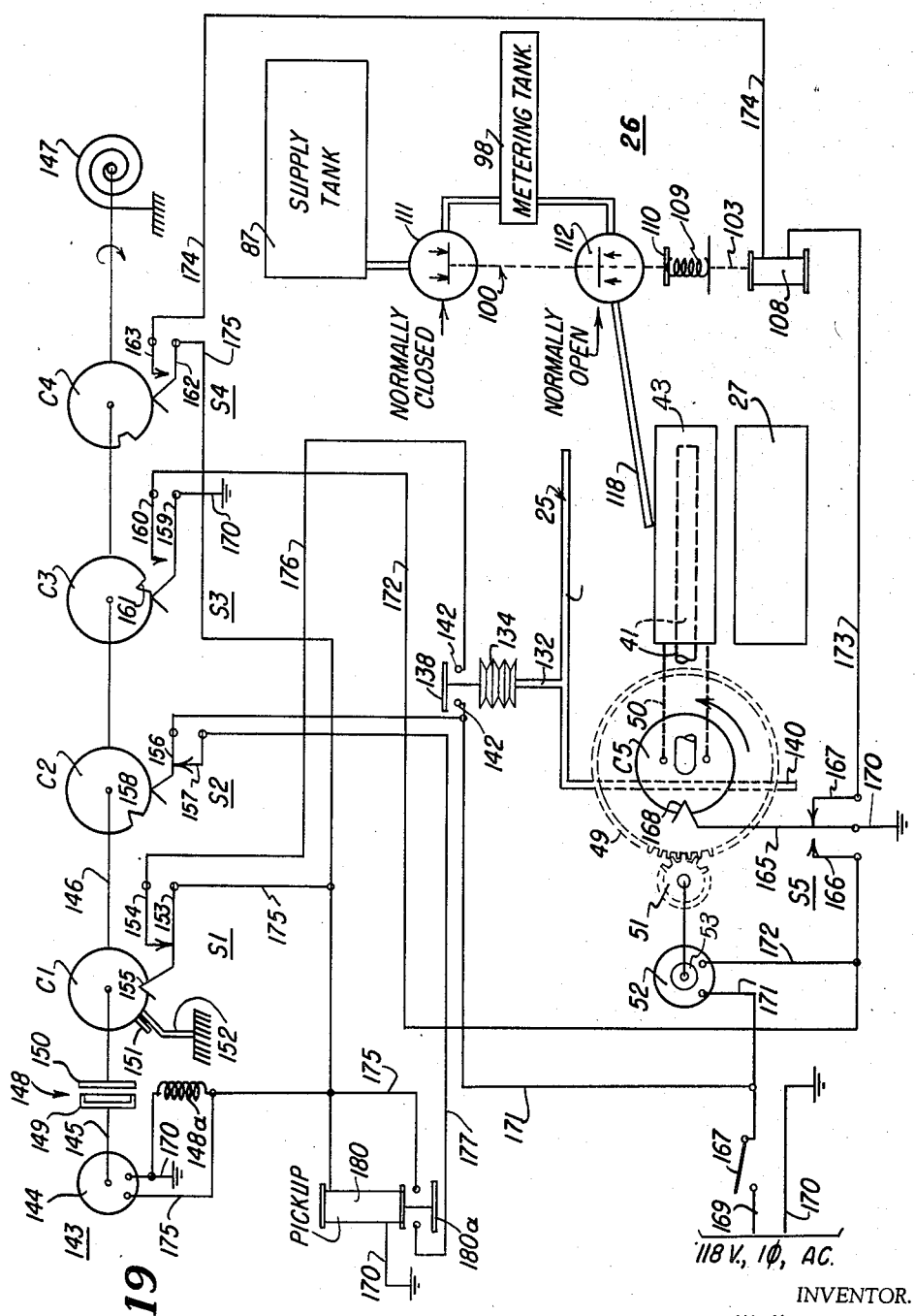

United States Patent Office 2,946,202
Patented July 26, 1960

2,946,202
AUTOMATIC ICE CUBE MAKING MACHINES

Walton F. Boeing, Chicago, Ill., assignor to General Electric Company, a corporation of New York Filed Jan. 17, 1958, Ser. No. 709,660

25 Claims. (Cl. 62—135)

This invention relates to an automatic ice cube maker, and more especially to a domestic refrigerator incorporating an automatic ice cube making system therein.

Systems have been developed heretofore for use in domestic or household refrigerators to automatically make ice cubes, but to a large extent such systems have a number of disadvantages, prominent among which is structural complexity in the refrigerant tubing and connections resulting from the necessity of rotating certain of the system components to eject ice cubes from the cups therefor. In many instances, the system controls for effecting the automatic cube making cycle are complex and expensive. Further, the freezing time is often unduly long because the heat is extracted from the water slowly. Also, a number of disadvantages occur in the ejection of the cubes as, for example, the adherence of one cube to those in adjacency therewith, the reattachment of a cube to certain walls of the freezer cup after initially being freed therefrom, and the general unreliability of the ejection apparatus that stems from the necessity of freeing the cubes from the walls of the freezer cup before such cubes can be ejected therefrom.

It is, accordingly, an object of the invention to provide an automatic ice cube maker system for household refrigerators that overcomes the disadvantages inherent in prior art systems.

Another object of the invention is in the provision of an automatic ice maker for houseful refrigerators and the like, which is compact and occupies little of the refrigerator storage space, which is simple both in terms of structure and the controls therefor, and which is reliable in the sense that cubes are always ejected from the freezer cups whereby such cups are vacated for the receipt of a subsequent charge of water and no spillage or overflow of the liquid occurs when the cups are refilled as would be the case if one or more of the cups retained a cube made in a prior freezing cycle.

Still another object is that of providing an automatic ice cube making system of the character described having a secondary refrigerant system therein whereby the freezing time in the cyclic operation is rapid, but in which all of the conduits defining the secondary refrigerant system are stationary with the result that leakproof connections, complex tubing, etc. are obviated.

Yet another object is to provide an automatic freezer of the type described, in which a bank of cups is rotated about a central shaft forming a part of the stationary secondary refrigerant system, and in which the cubes are freed from the bottom of the cups as the bank is rotated and are thereafter freed from the remaining walls of the cups and are positively displaced at a subsequent position in the rotation cycle.

A further object is in providing a freezer block having a bank of cups, each equipped with an ejection piston forming the bottom closure wall thereof, and wherein such ejection pistons are first retracted from the ice cubes and are thereafter reciprocated thereagainst to positively eject the cubes from the freezer cups, all as part of the automatic operating cycle.

Still a further object is to provide channels between adjacent freezer cups interconnecting the same to permit equal filling thereof from a single water outlet, and in which the channels are characterized by having structural features which break the bridge of ice joining adjacent cubes to free one from the other during the ejection thereof.

Yet a further object is to provide a water supply assembly comprising a part of the automatic ice cube maker system, for delivering measured volumes of water (or other suitable liquids such as flavored drinks) automatically to the freezer cups at cyclically determined intervals, and in which the reservoir and valve mechanism are maintained exteriorly of the refrigerator to prevent freezing of the liquid therein, and in which a supply tube carries liquid therefrom to a position adjacent and above the freezer cups and is oriented to permit drainage therefrom to thereby prevent ice collections therein.

Additional objects and advantages of the invention will become apparent as the specification develops.

An embodiment of the invention is illustrated in the accompanying drawings, in which—

Figure 6 is an enlarged, broken top plan view of the ice cube maker cell block or cup assembly;

Figure 7 is a longitudinal sectional view taken along the line 7—7 of Figure 6;

Figure 8 is a vertical sectional view of the cup assembly taken on the line 8—8 of Figure 7, and showing the normal position thereof;

Figure 9 is a vertical sectional view similar to that of Figure 8, but showing a temporary position thereof assumed during the ice cube ejection cycle;

Figure 10 is a vertical sectional view generally similar to Figure 8, but showing the cup assembly in an inverted position wherein ice cubes are ejected therefrom;

Figure 11 is a partial elevational and sectional view of a cup ejection piston and cam follower assembly, and the view is taken generally along the line 11—11 of Figure 8;

Figure 12 is essentially a front view in elevation of the ejection piston and cam follower assembly, and is taken generally along the line 12—12 of Figure 11;

Figure 13 is a top plan view of the structure illustrated in Figure 11 with the piston being broken away;

Figure 19 is a diagrammatic view of a control circuit for the ice cube maker.

Figure 1:
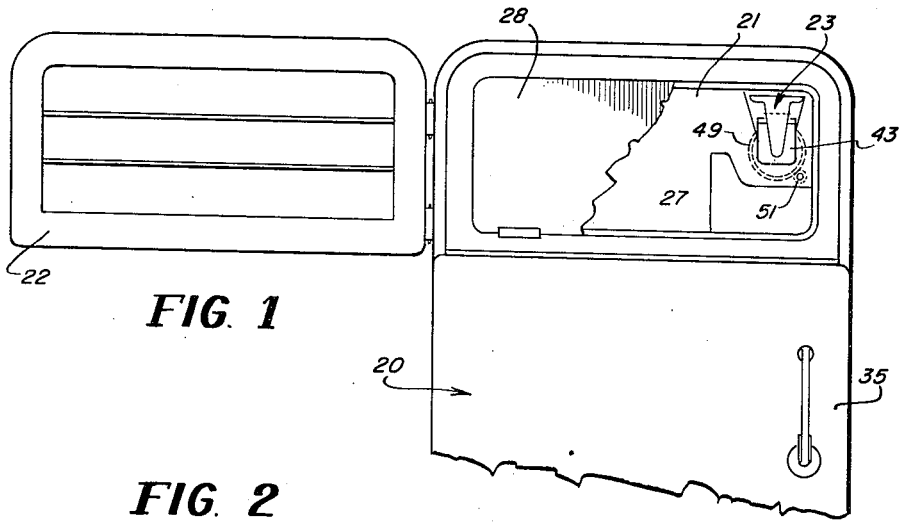
Figure 1 is a broken front view in elevation of a domestic freezer compartment equipped with an ice cube maker incorporating the invention.
Figure 2:
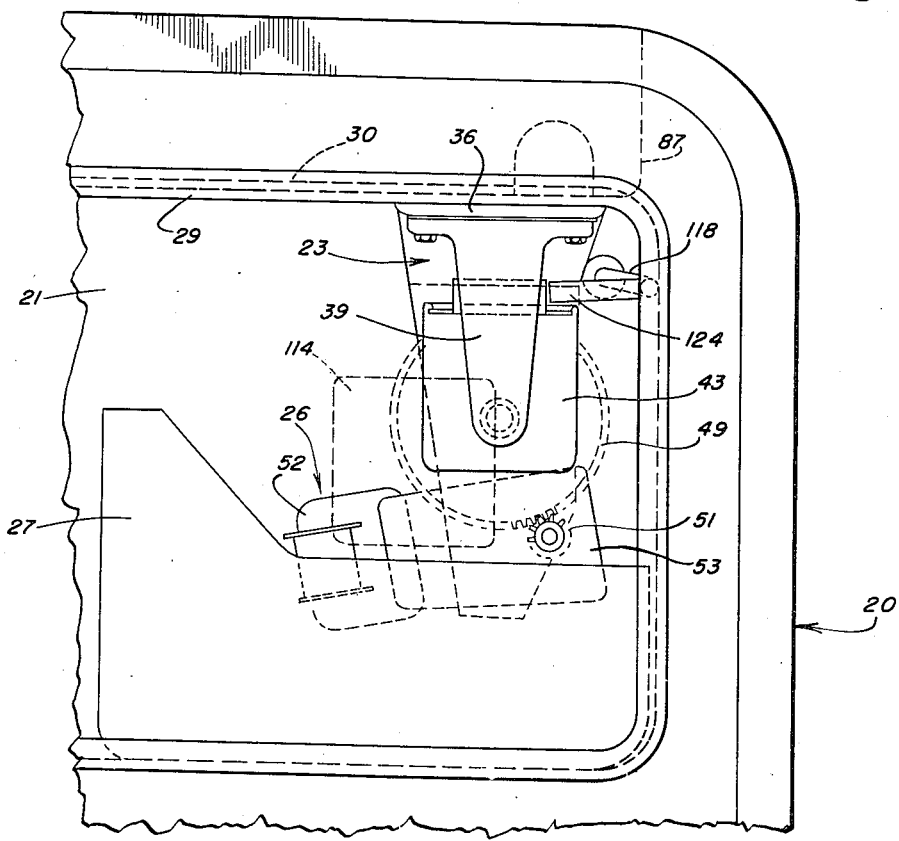
Figure 2 is an enlarged, broken front view in elevation of that portion of the freezer compartment containing the ice cube maker.

Prior to describing the structural details of the various components comprising the automatic ice cube maker system, it may be stated in general that the system is intended for use in a domestic or home refrigerator as exemplified by the refrigerator 20 shown in Figure 1, having a freezer compartment 21 equipped with a hinged door 22. The embodiment of the system as herein illustrated comprises a cube freezer and ejection apparatus denoted in general with the numeral 23 (Figures 1 through 16), a water supply assembly 24 (Figures 3 through 5), a secondary refrigerant system 25 (Figures 5 and 17), and a control assembly designated in general with the numeral 26 (Figures 2 and 19).

In the functioning of the system, a cyclic operational sequence is repeated wherein water is furnished from the water supply assembly 24 to the cube freezer 23 wherein the water is frozen by the secondary refrigerant system 25. After the water is frozen, the cube freezer is rotated through a 360° arc during which time the cubes are freed from the cups therefor and are ejected into a tray receptacle 27 (Figures 1, 2 and 5) when the apparatus 23 has rotated approximately 180° from its initial position, and then the freezer cups are refilled by the water supply assembly after the apparatus 23 is returned to the initial position thereof. The filling of the cups, freezing of the water therein, rotation of the maker and ejection of the cubes therefrom, and refilling of the cups, is automatically repeated in a cyclic pattern by the control assembly 26.

Figure 5:
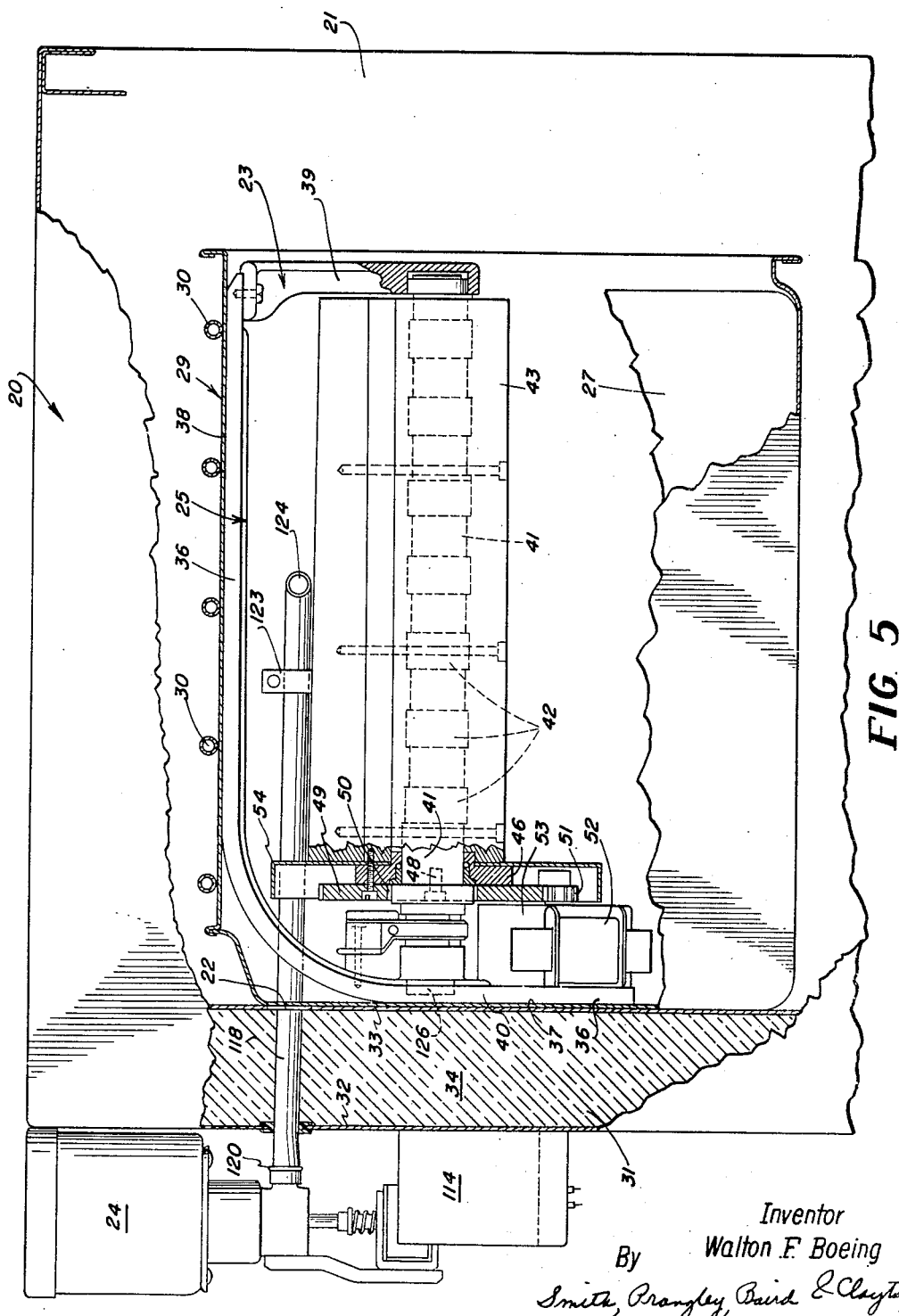
Figure 5 is a broken side view in elevation of the refrigerator, portions of a side wall thereof being broken away to reveal the ice cube maker mounted interiorly thereof, and in which portions of the ice cube maker are also broken away to illustrate features of the construction thereof.

In terms of primary structural and functional characteristics, the refrigerator 20 may be substantially conventional, and will have inner and outer shells spaced apart by thermal insulating material. Also, the freezer compartment 21 may have an inner door 28 hinged along an edge thereof so that it can be swung open to provide access to the interior of the compartment 21. The inner perimetric wall 29 of the freezer compartment may be equipped with refrigerant tubes 30 connected to the main or primary refrigerating system to maintain the temperature within the compartment at an appropriate sub-freezing value. For purposes of identification, the rear wall of the refrigerator casing is indicated with the numeral 31, and as shown in Figure 5 comprises an outer shell 32, the inner shell 33 and insulation 34 interposed therebetween. As shown in Figure 1, the refrigerator may have the usual handle-equipped door 35 affording a closure for the storage compartment therein.

*Freezer and ejection apparatus*

In describing the freezer and ejection apparatus, particular reference will be made to Figures 5 through 12, and thereafter to Figures 13 through 16 which show the distribution and ice breaker channels interconnecting adjacent cups.

The entire apparatus is supported by a bracket 36 of L-shaped configuration secured to the rear wall 37 and top wall 38 of the freezer compartment. The bracket has a depending hanger 39 at the forward end thereof that generally parallels the rear wall 37 of the compartment. Extending between the hanger 39 and rear depending leg 40 of the bracket, is a hollow tube or shaft 41 equipped at equally spaced intervals therealong with a plurality of cams 42. The shaft 41 is rigidly secured to the hanger and bracket leg 40, and is thereby constrained against rotation. Rotatably supported on the shaft 41 is a hollow casing or block 43. As is shown most clearly in Figure 7, the block is provided with a bearing 44 at the forward end thereof journalled on a reduced end portion 45 of the shaft. The block at the rear end thereof (as seen in Figure 5) is equipped with a flange-like bearing 46, similarly journalled on the shaft. Otherwise, the shaft 41 is spaced from the walls of the block which define a relatively large cavity 47 extending from end to end thereof.

Rigidly secured to the block 43 by cap screws 48 or other suitable means, is an annular gear 49 having an enlarged central opening 50 therethrough surrounding the shaft. In engagement with the toothed periphery of the gear 49 is a drive gear 51 driven by a motor 52 through a gear reducer 53. The motor and gear reducer are secured to the bracket 36, and preferably a protective shield 54 encloses the gears 49 and 51. It will be apparent that when the motor is energized, the drive gear 51 rotates the large gear 49, which in turn causes the block 43 to rotate about the shaft 41.

The top wall 55 of the block 43 is provided with a plurality of cylindrical openings therein aligned, respectively, with the cams 42 and each receiving a sleeve or insert 56 therein, formed of plastic such as nylon or Teflon. Each of the sleeves 56 is provided at the upper end thereof with an outwardly extending annular flange 57 that seats upon a shoulder 58 formed therefor about and coaxial with the openings in the wall 55. Further, the sleeves have a circumferential channel along the outer surface thereof adjacent the flange 57 adapted to receive an O-ring 59 or equivalent seal therein to prevent liquid seepage into or out of the cavity 47. Figure 7 indicates that the flanges 57 of adjacent sleeves are in contiguous relation; and preferably, each sleeve flares outwardly at the upper end thereof as shown at 60.

Rigidly secured to the upper surface of the top wall 55 by means of elongated screws 61, is a cup block 62 having a plurality of cups or receptacles 63 formed therein, respectively aligned with the sleeves 56 and consequently with the cams 42. The cups taper upwardly and outwardly as shown in Figures 7 and 8, and then have a generally frusto-conical configuration. In the specific illustration, there are seven such cups in communication with each other through channels 64 interposed therebetween. The cups are adapted to be filled with water in a manner to be described hereinafter. The cup block 62 has a recess 65 at the top of each of the cups 63.

Mounted for reciprocatory movement in each of the sleeves 56 is an ejection piston 66 that defines the bottom wall of the cup 63 therefor. Preferably, the pistons are formed of Teflon or have a Teflon coating sheathing the outer surface thereof. As is most apparent from Figure 11, each piston is provided with a depending cylindrical wall 67 having a pin 68 extending diametrically thereacross. The pin projects through a slot 69 elongated in the vertical direction, defined by a protuberance 70 of a cam follower 71 having an opening 72 therein that surrounds a cam 42 on the shaft 41. Figures 8, 9 and 10 show that the cam follower 71 is mounted for reciprocatory movement within the cavity 47 defined by the block 43 in a vertical direction (Figure 8). Interposed between the upper surface of the cam follower 71 and ejection piston 66 are helical springs 73 and 74 which bias the piston toward the outer end of the cup 63.

When the block 43 is rotated from the position shown in Figure 8 and into that illustrated in Figure 9, the cam follower 71 is forced downwardly within the cavity 47; and because of the engagement of the pin 68 with the upper edge of the slot 69, the pin is pulled downwardly and causes descent of the ejection piston 66 from the position thereof in Figure 8 to the one shown in Figure 9. As the block 43 continues to rotate toward the 180° position thereof shown in Figure 10, the cam follower 71 is moved toward the cup 63; and as a consequence, the piston 66 is moved into the cup 63.

Such movement of the piston is effected through the increased force applied thereto as the springs 73 and 74 tend to be compressed by movement of the cam follower. In this regard, it will be noted that should such movement of the piston be restricted, the springs will be compressed and thereby exert an incrementally increasing force against the piston as the block 43 continues to rotate toward the position thereof shown in Figure 10. As the block 43 is rotated through the remaining 180° to the Figure 8 position thereof, the cam 42 will be effective to reciprocate the follower 71 away from the cup 63, thereby returning the piston 66 to adjacency with the bottom of the cup.

Figure 14:
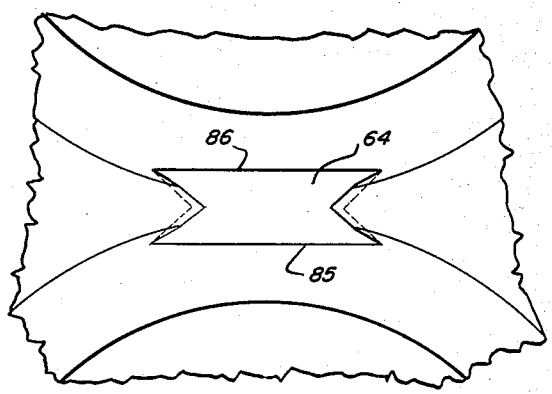
Figure 14 is a greatly enlarged, broken top plan view of the ice breaker channel between adjacent cups.
Figure 15:
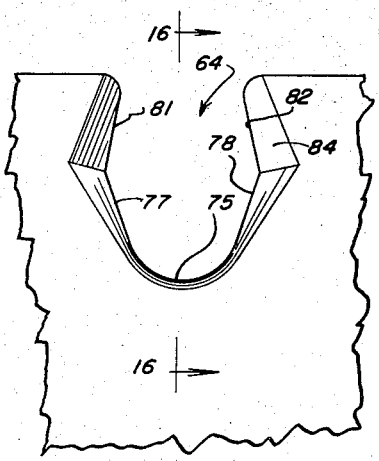
Figure 15 is a greatly enlarged, broken sectional view of the ice breaker channel, and is taken generally along the line 15—15 of Figure 16.
Figure 16:
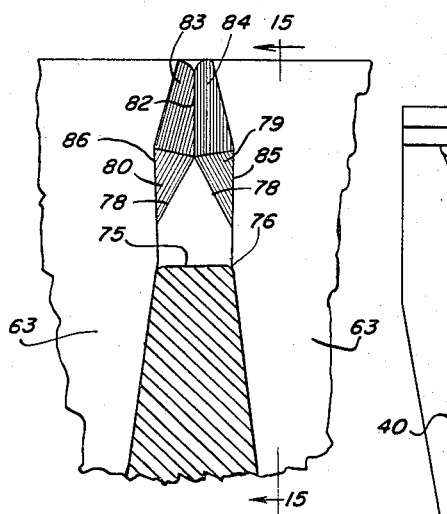
Figure 16 is a greatly enlarged, vertical sectional view of the ice breaker channel as seen along the line 16—16 of Figure 15.

The details of the channels 64 communicating the respective cups 63 are illustrated in Figures 14 through 16. Each channel has an arcuate bottom wall 75 slightly rounded at the edges, as shown at 76. The arcuate portion of the bottom wall merges with outwardly and upwardly diverging wall sections defined generally along the lines 77 and 78. However, these wall sections (as seen in Figure 16) have triangularly configurated wall portions 79 and 80 flaring outwardly toward the interior of the respective cups 63. Thus, the lines 78 meet at a point approximately midway between the top and bottom of the channel. The wall sections 77 and 78 turn inwardly and converge as shown along the lines 81 and 82. These lines, as shown in Figure 16, comprise the vertex of flattened, outwardly flaring wall segments 83 and 84. Thus, the channels each have a relatively narrow bottom, a wide intermediate section and a narrowed upper end, and a knife edge along each side thereof connects the wide intermediate portion with the restricted upper portion. Further, while the inner surface of each cup 63 is generally frusto-conical and flares outwardly from bottom to top, the portion thereof along the lower half of the channels 64 is substantially parallel to a true vertical axis, as shown in Figures 14 and 16. These flat, vertical portions extend inwardly of the remaining curved surface of the respective cups, and for identification are denoted with the numerals 85 and 86.

The channels 64 permit the filling of all of the cups 63 from a central outlet disposed along the row of cups. It will be evident that if the cups are to be filled equally, a layer of water will cover the arcuate lower edges 75 of the channels. The resultant bridge of ice must be broken during ejection of the ice cubes, and such a breaking action is afforded by the channel construction described.

*Water supply assembly*

Figure 3:
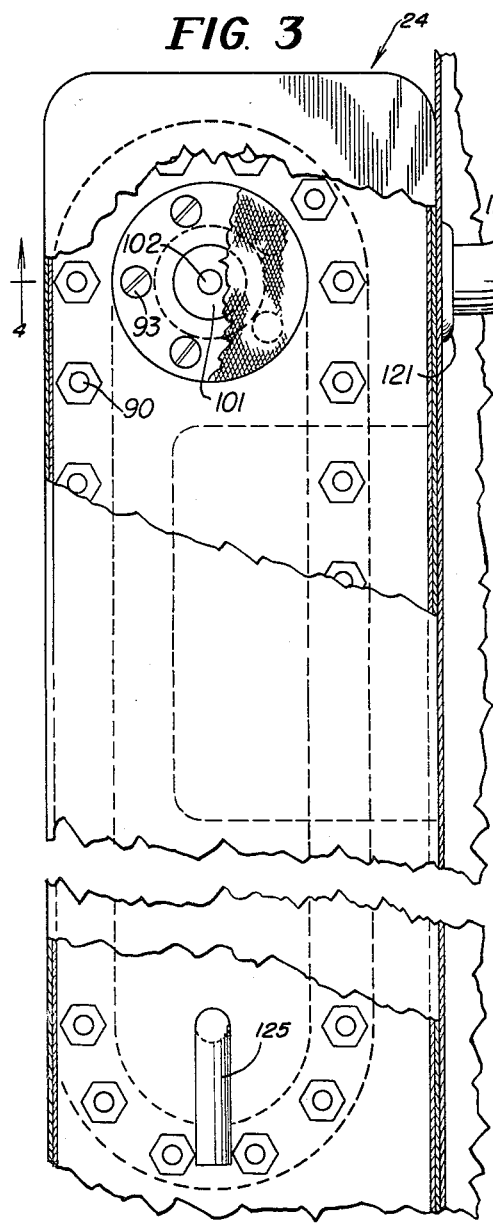
Figure 3 is a broken top plan view of the rear portion of the refrigerator, showing in particular the reservoir of the water supply system, and in which parts of the reservoir are illustrated in section.
Figure 4:
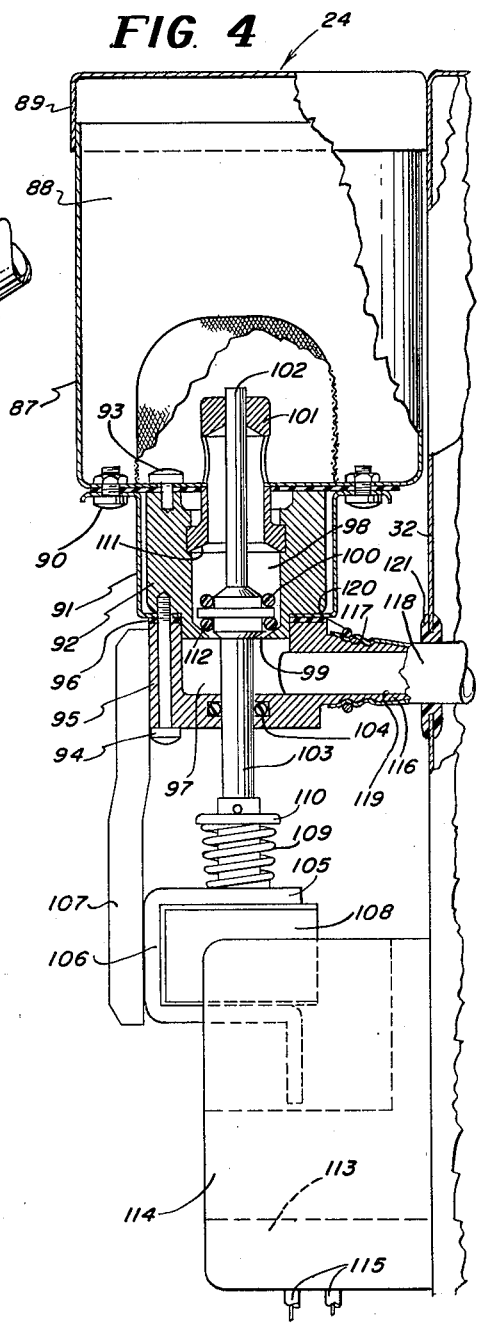
Figure 4 is a transverse sectional view of the water supply system taken along the line 4—4 of Figure 3.

Water is furnished to fill the cups 63 from a supply assembly 24 shown in Figures 3 through 5. The assembly 24 comprises a generally rectangular tank or casing 87 defining a reservoir 88 therein. The tank is carried by the rear wall of the refrigerator, and is equipped with a removable cover 89 that permits filling thereof. Though the reservoir 88 in the specific form shown must be manually filled, it will be apparent that the reservoir could be connected to a water supply line through a float valve or other control valve mechanism to afford automatic filling thereof.

The bottom wall of the casing 87 is secured by bolts 90 to an elongated bracket 91 having a valve casing 92 mounted therein by means of pins 93 and elongated bolts 94, the latter of which extend through a manifold 95 and thereby secure the same to the valve casing. Ordinarily, a gasket 96 will be interposed between the casing 92 and manifold 95 to effectuate a liquid-tight seal therebetween. The manifold 95 has an outlet chamber 97 therein communicating with a measuring chamber 98 through a port 99 equipped with a valve seat adapted to be engaged by a valve 100 to close the same. The measuring chamber 98 is adapted to receive liquid from the reservoir 88 through a port-equipped tube 101 extending thereinto. The upper end of the tube 101 is closed and defines a guide or bearing slidably receiving the stem 102 of the valve 100 therein. The stem extends downwardly from the valve and is slightly enlarged as shown at 103, and passes through the manifold 95 sealingly related therewith by an O-ring 104.

The lower end of the enlarged rod section 103 extends through the upper leg 105 of a U-shaped bracket 106 rigidly secured by a strap 107 to the manifold 95. Contained within the bracket 106 are the energizing coils 108 of a solenoid, the plunger or movable core of which is formed by the valve rod 103. A helical spring 109, seating at its lower end against the upper leg 105 of the bracket and at its other end against a seat 110 pinned or otherwise secured to the stem 103, biases the stem and its valve 100 upwardly toward the upper valve seat 111 to isolate the measuring chamber 98 from the reservoir 88. In such event, it will be apparent that the valve 100 will be spaced from the lower valve seat 112, whereupon the measuring chamber 98 will be in open communication with the outlet chamber 97. Thus, in the configuration shown in Figure 4, the solenoid is energized whereupon the valve 100 is held in engagement with the seat 112 against the biasing force of the spring 109, with the result that the measuring chamber 98 is being filled with liquid from the reservoir 88.

The solenoid coils 108 are electrically connected to a terminal strip 113 contained within a connector box 114, and through a circuit arrangement to be described hereinafter are connected to the power line 115 that terminates at the terminal strip 113. The manifold 95 is equipped with a tapered nipple 116 in open communication with the outlet chamber 97, and is provided with one or more circumferential grooves 117 thereabout. A flexible tube 118 having a gradually enlarging end portion 119 is adapted to telescopically receive the tapered nipple 116 therein, and is held in position thereon by a snap ring 120 that presses a portion of the tube into the groove 117 to establish a tight frictional interlock between the nipple and tube.

The tube 118 extends through the outer shell 32 of the refrigerator rear wall, and sealed relation is established therewith by a grommet 121. Figure 5 shows that the tube also extends through the inner shell 37, equipped with a grommet 122 therefor, and toward a position intermediate the ends of the freezer block 43. The tube may be held in position by a strap 123 secured to the side wall of the freezer compartment, and then turns inwardly as shown at 124 in Figures 2 and 5, and terminates over the cups 63. It will be noted that the tube is inclined downwardly throughout the length thereof so as to permit all of the liquid to drain therefrom, whereby ice collections within the tube are avoided. Preferably, as shown in Figure 3, the reservoir is equipped with a vent 125 to afford free flow of the liquid therefrom.

*Secondary refrigerant system*

Figure 17:
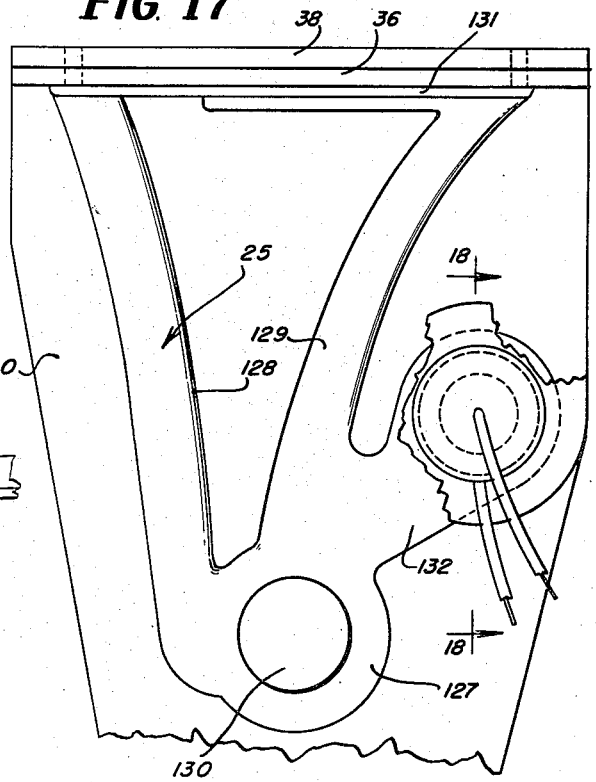
Figure 17 is an enlarged, broken front view in elevation of the rear wall of the freezer compartment, illustrating the heat exchanger of the secondary refrigerant system.
Figure 18:
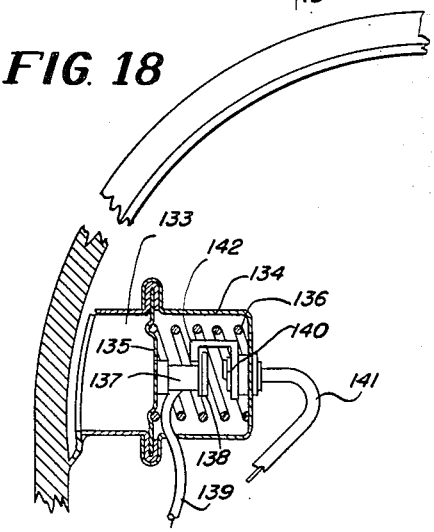
Figure 18 is an enlarged, broken vertical sectional view taken along the line 18—18 of Figure 17.

The secondary refrigerant system is illustrated in Figures 5, 17 and 18, and is comprised in part by the hollow cam-equipped shaft 41 which is closed at its outer end as shown most clearly in Figure 7. This shaft is fixedly secured at its inner end to the depending leg 40 of the bracket 36. The shaft at its inner end has a reduced portion 126 that extends into the point of juncture or enlarged interconnection 127 of a pair of refrigerant flow passages 128 and 129 with which the bracket 36 is equipped. Such enlargement has an annular opening 130 that slidably receives the reduced end portion 126 of the shaft therein.

The conduits 128 and 129 are generally V-shaped and diverge along the depending leg 40 of the bracket, and then extend forwardly along the top wall thereof, and are interconnected at their outer ends through conduit 131. An enlarged branch conduit 132 extends laterally of the conduit 129 and juncture 127, and communicates with a chamber 133 provided by a pressure-responsive switch 134 having a diaphragm 135 therein defining a closure for the chamber 133. The diaphragm is biased toward the left (as seen in Figure 18) by a helical spring 136, and is equipped with a post 137 provided at its outer end with a contact 138 electrically connected to lead 139. The second contact 140 electrically connected to a lead 141 has affixed thereto a generally U-shaped contact member 142 having a depending leg extending downwardly behind the contact 138 so that the spring 136 tends to urge the contact 138 into engagement with the depending leg of the contact 142 to close the circuit through the leads 139 and 141.

However, when the pressure of a fluid within the chamber 133 is sufficiently great to overcome the biasing force of the spring, the contact 138 is moved toward the right and away from engagement with the U-shaped contact 142, whereupon the circuit between the leads is interrupted. The secondary refrigerant system comprising the hollow shaft 41, conduits 128, 129 and 131 and the juncture 127 and branch conduit 132, is filled with a refrigerant such as Freon F–12. The shaft 41 forms the evaporator for the secondary refrigerant system while the upper branches of the conduits 128 and 129, which extend along the wall 38 of the freezer compartment and are in heat exchange relation with the coils 30 of the primary refrigerant system, form the condenser of the secondary system.

Thus, the refrigerant expands from a liquid to a vapor state in the tube 41, thereby extracting heat from the water contained within the freezer cups 63. The vapor travels upwardly through the conduit 129, is returned to a liquid state as heat is extracted therefrom by the primary coolant coils 30, and is returned to the shaft 41 through the conduit 128. This process is continuous until the water contained in the cups 63 is cooled to a predetermined temperature below freezing and is thereby transformed to the solid or frozen state. During this operational cycle, the pressure of the vapor at the branch passage 132 and in the switch chamber 133 is sufficient to overcome the biasing force of the spring and thereby interrupt the circuit through the leads 139 and 141. However, when the water is frozen to the desired temperature, the vapor pressure of the secondary refrigerant decreases and the spring 136 is effective to close the contacts. Such closing thereof is effective to energize the motor 52, whereupon the freezer block 43 is rotated to eject the ice cubes and thereafter return the freezer block to the initial position thereof so that the cups are refilled with water from the water supply system 24.

As shown in Figure 7, a fluid 47a is contained within the cavity 47 provided by the freezer block 43, and surrounds the shaft 41. This fluid may be ethylene glycol or some other material which will not be solidified by the relatively low temperatures surrounding the shaft 41. The material 47a contains flaked aluminum or other thermal conductor, and thereby facilitates a rapid heat exchange between the liquid in the cups 63 and the refrigerant in the shaft 41. Further, the composite material 47a serves as a lubricant for the reciprocating cam followers 71, cams 42 and reciprocable pistons 66. It will be noted that the cavity 47 is sealed by the O-rings 59 surrounding the respective pistons, by a plug 47b adjacent the outer end of the shaft 41, and by the bearing 46 and shield 54 adjacent the inner end of the freezer block.

Also, the cavity 47 contains a small amount of hydrogen, or other good thermal conduction gas, in addition to the material 47a, so as to accommodate compression incident to the inward movement of the pistons 66 into the positions of Figure 9.

*Control assembly*

The control assembly determines the various functions comprising an operational cycle of the system, and includes the components heretofore described, such as the gears 49 and 51, the motor 52, the valve 100 and the operating solenoid 108 therefor, as well as the pressure controlled device 134. Further, the system comprises a flyback timer 143 including a timer motor 144 of the synchronous type, such, for example, as a "Telechron" timer motor having an operating shaft 145 that is rotated a fixed number of revolutions per unit time, as well as a flyback shaft 146 carying a number of insulating control cams C1, C2, C3 and C4 operatively associated with corresponding switches S1, S2, S3 and S4. The flyback shaft 146 is restrained by a spring 147 into a normal stop position as determined by a movable stop 151 carried by the cam C1 and by a cooperating stationary stop 152. Also the timer 143 includes a clutch 148 provided with a pair of clutch plates 149 and 150 respectively carried by the motor shaft 145 and by the flyback shaft 146, as well as an operating solenoid 148a. The switch S1 comprises two switch springs 153 and 154, the switch spring 153 cooperating with a notch 155 provided in the cam C1; the switch S2 comprises two switch springs 156 and 157, the switch spring 156 cooperating with a notch 158 provided in the cam C2; the switch S3 comprises two switch springs 159 and 160, the switch spring 159 cooperating with a notch 161 provided in the cam C3; and the switch spring S4 comprises two switch springs 162 and 163, the switch spring 162 cooperating with a notch 164 provided in the cam C4. Also an insulating cam C5 is carried by the gear 49 and cooperates with a switch S5, the switch S5 including a switch spring 165 cooperating with a notch 168 provided in the cam C5, as well as with two adjacent switch springs 166 and 167. Also in the arrangement, the motor 52 is of the synchronous type and is preferably a "Telechron" timer motor, whereby the operating shaft thereof carrying the pinion 51 is rotated a fixed number of revolutions per unit time. Further, the system comprises a source of power supply of 118 volts, single phase, A.-C., including a pair of line conductors 169 and 170, the line conductor 169 being ungrounded and the line conductor 170 being grounded. A master switch 167 is provided, one terminal of which is connected to the line conductor 169 and the other terminal of which is connected to a conductor 171. Also the circuit comprises a pickup relay 180 provided with a contact bridging member 180a.

In the arrangement, the switch springs 153 and 154 respectively terminate two conductors 175 and 176; the switch springs 156 and 157 respectively terminate the conductor 171 and a conductor 177; the switch springs 159 and 160 respectively terminate the line conductor 170 and a conductor 172; the switch springs 162 and 163 respectively terminate the conductor 175 and a conductor 174; and the switch springs 165, 166 and 167 respectively terminate the conductor 172, the line conductor 170 and a conductor 173. The motor 52 is bridged across the conductors 171 and 172; the solenoid 108 of the valve 100 is bridged across the conductors 173 and 174; the winding of the pickup relay 180 is bridged across the line conductor 170 and the conductor 175; and the timer motor 144 and the solenoid 148a of the clutch 148 are bridged in parallel relation across the line conductor 170 and the conductor 175.

In the operation of the system, when the motor 52 is energized the block 43 is rotated out of its upstanding normal position through one complete revolution in the counterclockwise direction, as viewed in Figs. 8, 9 and 10, precisely one revolution and back into its normal upstanding position in a short time interval, such, for example, as thirty seconds. On the other hand, when the timer motor 144 is operated and the clutch 148 occupies its clutched position, the flyback shaft 146 is rotated in the clockwise direction out of its normal position at a low rate, such, for example, as one revolution per minute. Accordingly, it will be understood that the time of one revolution of the block 43 (thirty seconds) is substantially shorter than the time of one revolution of the flyback shaft 146 (sixty seconds).

Considering now the mode of operation of the system and assuming that the master switch 167 occupies its closed position; the contact bridging member 138 normally occupies its open position with respect to the associated contacts 142, when there is substantial pressure in the secondary refrigerant system, as indicated by the pressure responsive device 134, and when the block 43 is relatively warm. Also at this time, the motors 52 and 144 are deenergized; the winding of the pickup relay 180 is deenergized; and the solenoid 108 of the valve 100 is deenergized. Further, the switches S1 and S2 are closed, the switches S3 and S4 are open, and in the switch S5 the switch spring 165 disengages the switch spring 166 and engages the switch spring 167. Also it may be assumed that charges of water are contained in the cups 63, but that the water has not been frozen to produce ice cubes at this time. Moreover, the valve 111 is closed disconnecting the water supply tank 87 from the metering tank 98, while the valve 112 is open connecting the metering tank 98 to the fill tube 118 so that the metering tank 98 is empty. Finally, it may be assumed that an adequate suply of water is contained in the supply tank 87.

Under the conditions noted and as operation of the primary refrigerating system proceeds, heat is extracted thereby from the secondary refrigerating system 25, so that heat is extracted from the water in the cups 63; whereby ultimately the water contained therein is frozen to form corresponding ice cubes therein. When the ice cubes are formed in the cups 63, the vapor pressure in the secondary refrigerating system is substantially reduced by the secession of the high rate of heat flow thereinto from the water in the cups 63, so that the pressure in the device 134 is reduced causing the same to move the contact bridging member 138 toward engagement with the associated contacts 142. When this engagement is effected, the conductor 171 is connected to the conductor 176 at the contact bridging member 138, thereby completing a circuit including the switch springs 154 and 153 and the conductor 175 for energizing the winding of the pickup relay 180 via the line conductor 170. When thus energized, the pickup relay 180 operates to connect at the contact bridging member 180a the conductor 171 to the conductor 175 independently of the position of the contact bridging member 138, the path mentioned extends from the conductor 171 via the switch springs 156 and 157, the conductor 177 and the contact bridging member 180a to the conductor 175. Accordingly, a holding circuit, including the above-traced path, is completed for energizing the winding of the pickup relay 180. Also the application of power to the conductor 175 completes parallel circuits for operating the timer motor 144 and for energizing the solenoid 148a of the clutch 148. Thus the timer motor 144 is operated and the clutch 148 is operated into its clutched position; whereby the operating shaft 145 of the timer motor 144 rotates the flyback shaft 146 in the clockwise direction out of its normal stop position. As the flyback shaft 146 is operated out of its stop position, the cam C1 operates the switch S1 to open the switch springs 153—154 so as to interrupt a further point in the original pickup circuit for energizing the winding of the pickup relay 180; however without effect at this time by virtue of the completed holding circuit for energizing the winding of the pickup relay 180. Shortly thereafter, the control cam C3 operates the switch S3 so as to engage the switch springs 159 and 160, thereby completing a circuit including the conductor 172 for operating the timer motor 52. Upon operation, the timer motor 52 rotates the block 43 in the counterclockwise direction through the gears 51 and 49; and when the gear 49 is rotated out of its normal position, the cam C5 operates the switch S5 to open the switch spring 165 from the switch spring 167 and to close the switch spring 165 to the switch spring 166. Accordingly, at this time, a parallel holding circuit is completed for operating the timer motor 52 independently of the position of the switch S3, which holding circuit includes the closed switch springs 165 and 166. As operation of the timer 143 continues, the cam C3 operates the switch S3 to open the switch springs 159 and 160, thereby to interrupt the pickup circuit for operating the timer motor 52, so that continued operation of the timer motor 52 is controlled entirely by the switch S5.

As time proceeds, the timer motor 52 rotates the block 43 exactly one revolution in the counterclockwise direction and back into its normal upstanding position effecting ejection of the ice cubes from the cups 63 into the receiving tray 27 in the manner previously explained. At this time, the cam C5 operates the switch S5 so as to disengage the switch springs 165 and 166 and to re-engage the switch springs 165 and 167. Disengagement of the switch springs 165—166 interrupts the previously traced holding circuit for operating the timer motor 52; whereby further operation thereof is arrested at this time with the block 43 back into its normal upstanding position. Re-engagement of the switch springs 165—167 prepares a circuit for energizing the solenoid 108 that is subsequently completed when the cam C4 closes the switch S4 in the subsequent operation of the timer 143. The circuit for energizing the solenoid 108 extends from the conductor 170 via the closed switch springs 165—167 to the conductor 173, and from the conductor 171 via the closed switch springs 156—157, the conductor 177, the closed contact bridging member 180a, the conductor 175 and the closed switch springs 162—163 to the conductor 174, the solenoid 108 being bridged across the conductors 173 and 174. When thus energized, the solenoid 108 operates the valve 100 against the bias of the compression spring 109, closing the valve 112 and opening the valve 111. Accordingly, at this time, water from the supply tank 87 flows via the open valve 111 into the metering tank 98, but does not flow therefrom into the filling tube 118 by virtue of the closed position of the valve 112. Accordingly at this time, a measured or metered quantity of water adequate precisely to fill the seven cubes 63 in the block 43 is metered into the metering tank 98. Still subsequently in the operation of the timer 143, the cam C4 operates the switch S4 to open the switch springs 162—163, thereby to interrupt the circuit for energizing the solenoid 108, with the result that the compression spring 109 returns the valve 100 into its normal position closing the valve 111 and opening the valve 112. Closing of the valve 111 cuts off the connection between the supply tank 87 and the metering tank 98, while opening of the valve 112 opens the connection between the metering tank 98 and the filling tube 118, so that the metered quantity of water in the metering tank 98 spills through the filling tube 118 at a controlled rate into the cups 63 provided in the block 43, thereby filling the cups mentioned.

Still subsequently, when the timer 143 has completed its cycle of operation during a time interval slightly less than one minute, the cam C2 operates the switch S2 to open the switch springs 156 and 157; however prior to this time, the cups 63 in the block 43 have been filled with the warm water; whereby the vapor pressure in the secondary refrigerating system has increased substantially so as to actuate the contact bridging member 138 into its open position with respect to the contacts 142. Opening of the switch springs 156—157 interrupts the holding circuit for retaining operated the pickup relay 180 so as to cause the latter relay to restore and remove power from the conductor 175 at its contact bridging member 180a. When power is thus removed from the conductor 175, operation of the timer motor 144 is arrested and the solenoid 148a of the clutch 148 is deenergized so that the operating shaft 145 of the timer motor 144 is declutched from the flyback shaft 146. At this time, the spring 147 has been wound; whereby upon operation of the clutch 148 into its declutched position, the flyback shaft 146 is rapidly returned by the spring 147 back into its normal stop position as established by the stops 151—152. At this time, the cycle of operation of the circuit 26 has been completed; and another cycle of operation thereof is not initiated at this time by virtue of the fact that the pressure responsive device 134 occupies its position actuating the contact bridging member 138 into its open position with respect to the contacts 142.

Of course, subsequently when the water that has been delivered into the cups 63 provided in the block 43 has been forzen to produce ice cubes, the pressure responsive device 134 is again operated to initiate another cycle of the control circuit 26 in the manner described above.

*Operational summary*

From the foregoing, it will be apparent that the automatic ice cube maker system will operate continuously to produce ice cubes to the capacity of the reservoir 88. That is to say, as soon as one charge of liquid contained within the cups 63 has been frozen, the cubes then formed will be ejected into the tray 27 therebelow, and the cups thereafter filled with another charge of liquid from the reservoir. The rapidity of this cyclic operation will primarily depend upon the length of time required to adequately freeze the liquid charge in the cups 63. This time, in turn, will be related to the setting of the primary refrigerant system since the rate of heat exchange therewith is proportional to the temperature differential between the primary refrigerant coils 30 and the fluid in the secondary refrigerant system.

In the event that it is desired to terminate the cube making cycle after a certain number of cubes have been delivered to the tray 27, various switch controls may be incorporated to accomplish this result as, for example, a mechanically actuated switch controlled by a wand or sensing device that would feel or sense the quantity of cubes in the tray. Such an arrangement would be necessary, especially if the reservoir were continuously and automatically supplied with tap water to maintain the liquid level therein.

The structural composition of the freezer block 43 and secondary refrigerant system is relatively simple since all of the elements of the latter are stationary and the freezer block rotates thereabout. Consequently, seals for rotating joints, complex tubing arrangements, etc. are avoided. The heat transfer medium in the form of the material 47a within the freezer block cavity assures relatively rapid freezing of the liquid in the cups 63 by facilitating the removal of heat therefrom. The reciprocatory pistons positively displace the ice cubes from the cups 63 in a multiple-stage sequence wherein the pistons are first withdrawn or retracted from the bottom wall of the cube to free the same therefrom, and are thereafter pressed against the cubes to force the same from the cups. Such force is progressively increased through the cushioning action of the springs 74, which then prevent a sharp impact of the pistons against the cubes which could damage the apparatus or fracture the cubes.

Moreover, the configuration of the channels between the adjacent cups 63 effects a severance of one cube from another during the ejection thereof, thereby preventing topping. In addition, the flattened wall portions of the cups adjacent the channels effect a lateral shifting of the cubes as they are pressed outwardly, which further assures a separation of one cube from another and which also prevents adherence or reattachment of the cubes to the ejection pistions which might otherwise result in returning the cubes to the cups as the pistons are retracted.

While in the foregoing specification an embodiment of the invention has been set forth in considerable detail for purposes of making an adequate disclosure thereof, it will be apparent to those skilled in the art that numerous changes may be made in those details without departing from the spirit and principles of the invention.

What is claimed is:

1. In combination with a refrigerator having a casing defining a freezer compartment therein and being provided with a primary refrigerant system having an evaporator operatively associated with said freezer compartment, an automatic cube maker system comprising a hollow shaft closed at its outer end and being fixedly supported at its inner end with respect to said casing, said shaft having a plurality of axially spaced cams therealong, a freezer block provided with an elongated cavity therein passing said shaft therethrough and being rotatably supported thereon, said block being provided with a plurality of freezer cups respectively aligned with said cams, a plurality of ejection pistons respectively providing the bottom wall closures for said cups and being reciprocable therein, a plurality of cam followers respectively cooperating with said cams and with said pistons, said cam followers being reciprocable within said cavity respectively to reciprocate said pistons in said cups incident to rotaton of said block about said shaft so as to effect the ejection of frozen cubes from said cups, a motor operative to rotate said block about said shaft, a liquid supply system including a measuring chamber, a conduit communicating at one end thereof with said measuring chamber and terminating at the other end thereof above said cups, valve mechanism operative to effect the delivery of a measured charge of liquid from said measuring chamber via said conduit to said cups, a secondary refrigerant system including said hollow shaft as an evaporator and provided with a condenser arranged in heat-exchange relation with said primary evaporator, a temperature responsive switch governed by said secondary refrigerant system, means controlled by said switch for operating said motor to rotate said block so as to effect the ejection of frozen cubes from said cups and then for operating said valve to effect the delivery of a measured charge of liquid from said measuring chamber through said conduit to said cups.

2. The combination set forth in claim 1, and further comprising a plurality of lost-motion connections respectively between said pistons and said cam followers, and a plurality of compression springs respectively between said pistons and said cam followers, thereby to cushion the displacement force applied by each cam follower through the associated piston to the frozen cube in the associated cup.

3. The combination set forth in claim 1, and further comprising a body of thermal conductive fluid arranged in said cavity to facilitate the transfer of heat from the liquid in said cups to said shaft.

4. The combination set forth in claim 3, wherein said body of fluid includes a quantity of a liquid having a freezing point disposed well below 32° F. and a quantity of a compressible gas.

5. In combination with a refrigerator having a casing defining a freezer compartment therein and being provided with a primary refrigerant system having an evaporator operatively associated with said freezer compartment, an automatic cube maker system comprising a hollow shaft closed at its outer end and fixed at its inner end with respect to said casing, a freezer block provided with an elongated cavity therein passing said shaft therethrough and being rotatably supported thereon, said block being provided with a plurality of longitudinally spaced-apart freezer cups therein, a plurality of ejection pistons respectively providing the bottom wall closures for said cups and being reciprocable therein, means responsive to rotation of said block about said shaft for reciprocating said pistons in said cups so as to effect the ejecton of frozen cubes from said cups, means for rotating said block, means for automatically supplying liquid to said cups subsequent to the ejection of cubes therefrom, a cooling system including said hollow shaft as a heater and a cooler arranged in heat-exchange relation with said primary evaporator and containing a charge of cooling fluid that is circulated between said heater and said cooler, and control means for determining an automatic cycle of operation for said cube maker system, wherein a charge of liquid is frozen in said cups and then said block is rotated about said shaft to effect the ejection of the frozen cubes from said cups and then another charge of liquid is delivered to said cups.

6. The combination set forth in claim 5, in which said cups have generally conical side walls that taper outwardly from said pistons, and in which flow channels are interposed between adjacent cups to permit the flow of liquid therebetween so as to effect substantially uniform filling of said cups.

7. The combination set forth in claim 6, in which said channels have converging wall portions adjacent the outer ends thereof to effectuate a severance of one frozen cube from another during the ejection thereof.

8. The combination set forth in claim 5, in which said means for rotating said block comprises a gear fixedly secured to said block, a motor, and gearing interconnecting said motor and said gear.

9. The combination set forth in claim 5, in which during rotation of said block said pistons are first retracted from the frozen cubes in said cups so as to break the bonds thereto and thereafter said pistons are projected into said cups so as positively to displace the frozen cubes from said cups.

10. In an automatic ice cube maker system for use with a household refrigerator, a shaft provided with a passage extending longitudinally therein, means for circulating a cooling fluid through said passage, a freezer block mounted upon said shaft for rotation thereabout and having a cavity surrounding said shaft, a cam provided by said shaft within said cavity, a cam follower in engagement with said cam and being reciprocated thereby along a plane generally normal to the longitudinal axis of said shaft when said block is rotated thereabout, a cup provided by said block in alignment with said cam follower, a reciprocable piston defining the bottom wall closure for said cup, means connecting said cam follower with said piston whereby said piston is reciprocated within said cup when said block is rotated, means for rotating said block, a body of thermal conductive fluid arranged within said cavity and surrounding said shaft to define a good heat exchange relation between the water placed within said cup and the cooling fluid within said passage.

11. The ice cube maker set forth in claim 10, in which said means for connecting said cam follower and said piston comprises a slot provided by said cam follower and being elongated along the reciprocatory axis thereof, and a pin extending through said slot and being fixedly secured to said piston.

12. The ice cube maker set forth in claim 11, and further comprising a spring interposed between said piston and said cam follower to bias said piston in one direction toward the limit position defined by said slot and said pin.

13. The ice cube maker set forth in claim 10, in which said cam follower comprises a block of material having an opening therein surrounding said cam and engaging the same, said cam and said opening being configurated so that said cam follower is moved in a direction to retract said piston from said cup when said freezer block is initially rotated and thereafter to force said piston into said cup when said freezer block is further rotated.

14. In an ice cube making machine, a freezer block having a cavity therein, a cam follower reciprocable within said cavity along an axis from top to bottom thereof and being provided with a cam follower opening therethrough, a shaft extending through said cavity and being equipped with a cam oriented within said cam follower opening, said block being journalled for rotation about said shaft, said block having a piston opening therein aligned with said cam follower and having also a freezer cup forming a continuation of said piston opening and extending upwardly therefrom, a piston reciprocable within said piston opening and being connected with said cam follower, said cam and said cam follower opening being configurated so that said piston is retracted from said cup during the initial rotational movement of said shaft and is thereafter displaced into said cup during the subsequent rotational movement of said block, and means for rotating said block about said shaft.

15. The ice cube making machine set forth in claim 14, in which said piston opening is equipped with a plastic liner slidably engaging said piston.

16. The ice cube making machine set forth in claim 14, in which said shaft is provided with a flow passage therein defining a conduit for a secondary refrigerant system and contains a refrigerant therein.

17. The ice cube making machine set forth in claim 16, in which said cavity contains a material serving as a lubricant for said cam and said cam follower and being admixed with a thermal conductive medium to facilitate the transfer of heat from the liquid in said cup to said refrigerant in said passage.

18. In an ice cube making machine, a freezer block having a cavity therein, a plurality of cam followers reciprocable within said cavity along an axis from top to bottom thereof, a shaft extending through said cavity and being equipped with a plurality of cams respectively cooperating with said cam followers, said block being journalled for rotation about said shaft and having a plurality of piston openings therein respectively aligned with said cam followers and also having a plurality of freezer cups therein forming continuations of said respective piston openings and extending upwardly therefrom, a plurality of pistons respectively reciprocable within said piston openings and respectively connected with said cam followers, said cams being configurated so that said pistons are retracted from said cups during the initial rotational movement of said block about said shaft and so that thereafter said pistons are displaced into said cups during subsequent rotational movement of said block about said shaft in order to eject the ice cubes therefrom, and means for rotating said block about said shaft, said block also having a plurality of channels therein respectively communicating between adjacent ones of said cups to permit the flow of liquid therethrough and thereby to fill said cups from a common source.

19. The ice cube making machine set forth in claim 18, in which each of said channels has both a relatively narrow bottom and a relatively narrow top and is centrally widened to effect a severance between adjacent ones of the cubes during the ejection thereof from adjacent ones of said cups.

20. The ice cube making machine set forth in claim 19, in which the edges of said channels along the upper portions thereof are generally V-shaped to form a knife-edged wedge.

21. The ice cube making machine set forth in claim 19, in which said cups have upwardly and outwardly tapering side walls and are provided with flattened wall segments along the lower portions of said channels.

22. In an automatic ice cube maker for use with a household refrigerator, a shaft fixed in a generally horizontal position with respect to such refrigerator and being provided with a longitudinally extending passage therein, a frezer block mounted for rotation upon said shaft and providing a cavity surrounding the same, said block being provided with a freezer cup adapted to receive liquid therein, said cup being provided with a movable member defining the bottom closure thereof, means connected with said shaft for moving said member in order to eject a frozen cube from said cup when said block is rotated about said shaft, means for rotating said block about said shaft, a refrigerant system including said passage, and a thermal conductive fluid contained within said cavity and surrounding said shaft.

23. The ice cube maker set forth in claim 22, in which said member is movable between a retracted position and an extended position during rotation of said block sequentially to withdraw said member from the bottom wall of a cube in said cup and thereafter to press said member against the bottom wall of the cube positively to displace the same from said cup.

24. The ice cube maker set forth in claim 22, wherein said means for rotating said block includes a motor operatively connected to said block, a circuit for controlling said motor, and a temperature sensitive switch operatively associated with said passage for governing said circuit; whereby said motor is controlled to effect an automatic rotation of said block and an ejection of a cube from said cup after the formation of a frozen cube from liquid initially contained within the cup, said switch being sensitive to the lowering of the temperature of the liquid contained within said cup to complete said circuit and thereby to initiate operation of said motor so as to effect said automatic ejection cycle.

25. In an automatic ice cube maker for use with a household refrigerator, a shaft fixed in a generally horizontal position with respect to such refrigerator and being provided with a longitudinally extending passage therein, a freezer block mounted for rotation upon said shaft and providing a cavity surrounding the same, said block being provided with a freezer cup adapted to receive liquid therein, said cup being provided with a movable member defining the bottom closure therefor, means connected with said shaft for moving said member in order to eject a frozen cube from said cup when said block is rotated about said shaft, a refrigerant system including said passage, a thermal conductive fluid contained within said cavity and surrounding said shaft, said block having a normal upstanding position in which said cup is adapted to receive and to contain the liquid to be frozen therein, means controlled by the freezing of the liquid in said cup into a cube therein for rotating said block exactly one revolution about said shaft so as to effect ejection of the frozen cube from said cup when said cup is directed downwardly away from the normal upstanding position of said block, and means controlled subsequent to the rotation of said block back into its normal upstanding position for supplying liquid into said cup to be frozen into a cube therein.

References Cited in the file of this patent

UNITED STATES PATENTS

| | | |
|---|---|---|
| 1,870,370 | Marchaut | Aug. 9, 1932 |
| 2,063,208 | Tweedale | Dec. 8, 1936 |
| 2,389,317 | Kitto | Nov. 20, 1945 |
| 2,522,651 | Van Vleck | Sept. 19, 1950 |
| 2,770,102 | Roedter | Nov. 13, 1956 |
| 2,778,200 | Gaugler | Jan. 22, 1957 |
| 2,808,707 | Chace | Oct. 8, 1957 |
| 2,846,854 | Galin | Aug. 12, 1958 |